United States Patent [19]
August et al.

[11] Patent Number: 6,100,916
[45] Date of Patent: Aug. 8, 2000

[54] SYSTEM AND METHOD FOR SUBSCRIBER CONTROLLED SIGNAL BLOCKING

[75] Inventors: Katherine Grace August, Matawan; Avi I. Hauser, Marlboro, both of N.J.; John M. Manoyan, New Haven, Conn.; Theodore Sizer, II, Little Silver, N.J.

[73] Assignee: Lucent Technologies Inc., Murray Hill, N.J.

[21] Appl. No.: 09/082,240

[22] Filed: May 20, 1998

[51] Int. Cl.[7] ..................................................... H04N 7/16
[52] U.S. Cl. ................................ 348/5.5; 348/6; 348/10; 455/6.2; 380/10; 380/20
[58] Field of Search ........................... 348/1, 5.5, 6, 10, 348/460; 455/2, 6.1, 6.2, 6.3, 1; 380/10, 20; H04N 7/167

[56] References Cited

U.S. PATENT DOCUMENTS

| | | | |
|---|---|---|---|
| 4,807,031 | 2/1989 | Broughton et al. | 358/142 |
| 5,418,559 | 5/1995 | Blahut | 348/10 |
| 5,539,449 | 7/1996 | Blahut et al. | 348/7 |
| 5,541,638 | 7/1996 | Story | 348/7 |
| 5,550,575 | 8/1996 | West et al. | 348/5.5 |
| 5,570,126 | 10/1996 | Blahut et al. | 348/7 |
| 5,570,295 | 10/1996 | Isenberg et al. | 364/514 |
| 5,583,576 | 12/1996 | Perlman et al. | 348/460 |
| 5,649,283 | 7/1997 | Galler et al. | 455/2 |
| 5,663,766 | 9/1997 | Sizer, II | 348/473 |
| 5,678,041 | 10/1997 | Baker et al. | 395/609 |
| 5,751,335 | 5/1998 | Shintani | 348/5.5 |
| 5,758,258 | 5/1998 | Shoff et al. | 455/5.1 |
| 5,828,402 | 10/1998 | Collings | 348/5.5 |

FOREIGN PATENT DOCUMENTS

| | | | |
|---|---|---|---|
| WO 94 14284 | 6/1994 | WIPO | H04N 7/16 |
| WO 97 23996 | 7/1997 | WIPO | H04N 7/10 |

OTHER PUBLICATIONS

"SuperVision—The Family Television Manager," a product brochure/description, found on the Internet at http://www-.parent-tools.com/sv-desc.html on Jan. 22, 1998.

*Primary Examiner*—Victor R. Kostak
*Assistant Examiner*—Habte Bahgi
*Attorney, Agent, or Firm*—Donald P. Dinella

[57] ABSTRACT

A technique for the blocking of individual programs and/or portions of programs transmitted in a source signal, e.g., a cable television signal. In particular, individual programs and/or portions of programs within a class of programs are blocked, while allowing for the viewing of certain other programs even within the same programming class. The transmitted source signal contains individual programs having a transparent program identifier and/or transparent content identifier associated with individual programs in the source signal transmission. As the source signal enters, e.g., a particular subscriber location, the source signal is monitored in accordance with a program viewing profile defined by the subscriber. That is, particular ones of the programs and/or portion thereof available in the source signal transmission supplied to the subscriber can either be unblocked, i.e., viewable, or blocked, i.e., unviewable, at the discretion of the subscriber. The blocking of particular ones of the programs and/or portion thereof is accomplished as a function of the transparent program identifier and/or transparent content identifier associated with a program which is embedded in the video and/or audio component of the source signal. The transparent identifiers are transmitted concurrently with the individual program as the source signal is received at the subscriber location. Advantageously, the subscriber is given complete control and selectivity over which programs and/or portions thereof are viewed, e.g., by children of the subscriber.

18 Claims, 3 Drawing Sheets

SYSTEM AND METHOD FOR SUBSCRIBER CONTROLLED SIGNAL BLOCKING

FIELD OF THE INVENTION

The present invention relates to video systems and, more particularly, to a technique for controlling the viewing of programs in such video systems.

BACKGROUND OF THE INVENTION

The advent of cable television systems has made possible the transmission and availability of a wide array of television programs directly to the homes of subscribers, i.e., viewers. For a majority of viewers, there no longer exists a restriction to the number of VHF and UHF channels that are available in a particular geographic region. Rather, cable television systems have allowed for the delivery of hundreds of channels with the only major restriction being the transmission characteristics of the cable itself and the ability to compress the information in television programs into the narrower-bandwidth channels. The impact of cable television in the United States has been universal and in some ways, controversial.

More particularly, the significant increase in television programming content available in the United States has lead to certain controversy of how to regulate the viewing of programs containing varying amounts of violence, sexual content, and coarse language. In response to the general public's concerns, and in particular parents, the U.S. Congress passed the Telecommunications Act of 1996. The Telecommunications Act requires that all new television sets (13 inches or larger) made available in the U.S. be equipped with the so-called "V-chip", a device that allows parents to block television programming in three areas: violence, sex, and language. The technology for implementing the V-chip is similar to that used in delivering the current closed-captioning features of modern day programming. That is, program rating information is transmitted along with the television signal, and be decoded by the V-chip within the television set. The V-chip compares the rating code carried by the program with values preset by the viewer. This allows the V-chip to block entire classes of programs which carry rating codes higher than the preset viewer values.

Pursuant to a recommendation in the Telecommunications Act, and on a voluntary basis, the television broadcast industry developed an age-based rating plan which provides four main program designations (so-called "TV Parental Guidelines"): TV-G (general audiences), TV-PG (parental guidance suggested), TV-14 (parents strongly cautioned), and TV-M (mature audiences only.) In modern-day broadcasts, the TV Parental Guidelines appear at the beginning of each televised program, except for news and sports programs which are exempt from the Act. Thus, the implementation of the V-chip is directed at assisting parents in controlling their children's access to television programming that they believe contains inappropriate or potentially harmful content. Essentially, parents may block an entire category of programs, e.g., TV-M, from being viewed by their children.

In addition to the V-chip, there exist other commercially available devices which allow parents to regulate their children's television viewing habits. For example, SuperVision™, available from SuperVision, Inc., La Quintas, Calif., is marketed as a V-chip alternative which allows parents to automatically regulate the amount of television their children view. The device attaches to a television and is programmed by the user to provide, e.g., specific allotted times during any given week when a child can watch television. Similar to the V-chip, this device effectively blocks access to an entire class of programming.

While the above-described devices are effective in regulating television viewing habits, they each share a characteristic which somewhat limits the flexibility of the subscriber in having total control of a their viewing choices, e.g., viewing by their children. That is, each of these devices block entire classes of programs from viewing but do not allow for the blocking of individual programs within a class. For example, the user can block all TV-PG programs from being viewed but cannot allow a particular TV-PG program to be viewed if they determine that this particular program's content is acceptable for viewing. Thus, the viewer is presented with an "all-or-nothing" approach for regulating their child's (and their own) viewing of television programming.

Therefore, a need exists for a signal blocking technique which allows for the blocking of individual programs and/or portions of programs within a particular class of programs while allowing for the viewing of certain other programs within the same programming class.

SUMMARY OF THE INVENTION

The present invention provides a technique for the blocking of individual programs and/or portions of programs transmitted in a source signal. In particular, individual programs and/or portions of programs are blocked, while allowing for the viewing of certain other programs even within the same programming class. In particular, in accordance with one aspect of the invention, the transmitted source signal, e.g., a cable television signal, contains individual programs which have a transparent program identifier associated with particular programs. As the source signal enters, e.g., a particular subscriber location, the source signal is monitored in accordance with a program viewing profile defined by the subscriber. That is, particular ones of the programs available in the source signal transmission supplied to the subscriber can either be unblocked, i.e., viewable, or blocked, i.e., unviewable, at the discretion of the subscriber. In accordance with an embodiment the invention, the blocking of particular ones of the programs is accomplished as a function of the transparent program identifier associated with a program which is embedded in the video component of the source signal. The transparent program identifier is transmitted concurrently with the individual program as the video component of the source signal is received at the subscriber location. Advantageously, the subscriber is given complete control and selectivity over which programs are viewed, e.g., by children of the subscriber.

In accordance with a further embodiment of the invention, the blocking of particular ones of the programs is accomplished as a function of the transparent program identifier associated with a program which is embedded in the audio component of the source signal. The transparent program identifier is transmitted concurrently with the individual program as the audio component of the source signal is received at the subscriber location. As before, advantageously, individual programs are blocked, while allowing for the viewing of certain other programs even within the same programming class.

In accordance with a further aspect of the invention, the transmitted source signal containing individual program content also contains transparent content identifiers associated with the programs in the source signal transmission. Thus, in accordance with this further aspect of the invention, the transparent content identifier is employed to block specific portions of individual programs in accordance with the program viewing profile defined by the subscriber. That is, the invention not only facilitates the blocking of entire programs as described above, but also provides the subscriber with the capability and flexibility to block particular portions of a program while allowing for other portions of the same program to be viewed. For example, a subscriber, in accordance with the invention, can specify that all violent content, e.g., scenes containing gunfire or physical violence, in all programs within the source signal transmission be blocked. Thus, rather than specifying that an entire program be blocked, the subscriber, in accordance with this aspect of the invention, may choose to view a particular program but can block particular portions of the program which the subscriber deems inappropriate or uninteresting.

In accordance with various embodiments of the invention, the transparent program identifier and/or transparent content identifier associated with particular programs are digitally encoded by modulating the source signal or tone using amplitude shift keying ("ASK") wherein the identifiers are added to the source signal, in the video and/or audio component of the source signal, so that the identifier is not perceptible to a viewer of the program but have sufficient intensity for signal transmission and detection in accordance with the invention. In accordance with further embodiments of the invention, the transparent identifiers associated with the programs are digitally encoded by modulating the source signal or tone using frequency shift keying ("FSK") wherein the identifiers are again added to the source signal, in the video and/or audio component of the source signal, so that the identifiers are not perceptible to a viewer of the program but has sufficient intensity for signal transmission and detection in accordance with the various aspects of the invention.

BRIEF DESCRIPTION OF THE DRAWINGS

Throughout this disclosure, unless otherwise noted, like elements, blocks, components or sections in the figures are denoted by the same reference designations.

DETAILED DESCRIPTION

The present invention provides a technique for the blocking of individual programs and/or portions of programs transmitted in a source signal. In particular, individual programs and/or portions of programs are blocked, while allowing for the viewing of certain other programs even within the same programming class. In particular, in accordance with one aspect of the invention, the transmitted source signal contains individual programs having a transparent program identifier associated therewith in the source signal transmission, e.g., a cable television signal. As the source signal enters, e.g., a particular subscriber location, the source signal is monitored in accordance with a program viewing profile defined by the subscriber. That is, particular ones of the programs available in the source signal transmission supplied to the subscriber can either be unblocked, i.e., viewable, or blocked, i.e., unviewable, at the discretion of the subscriber. In accordance with various embodiments the invention, the blocking of particular ones of the programs and/or a portion thereof is accomplished as a function of the transparent program identifier and/or transparent content identifier associated with a particular program which is embedded in the video and/or audio component of the source signal. The transparent identifiers are transmitted concurrently with the individual program as the source signal is received at the subscriber location. Advantageously, the subscriber is given complete control and selectivity over which programs and/or portions thereof are viewed, e.g., by children of the subscriber.

Figure 1:
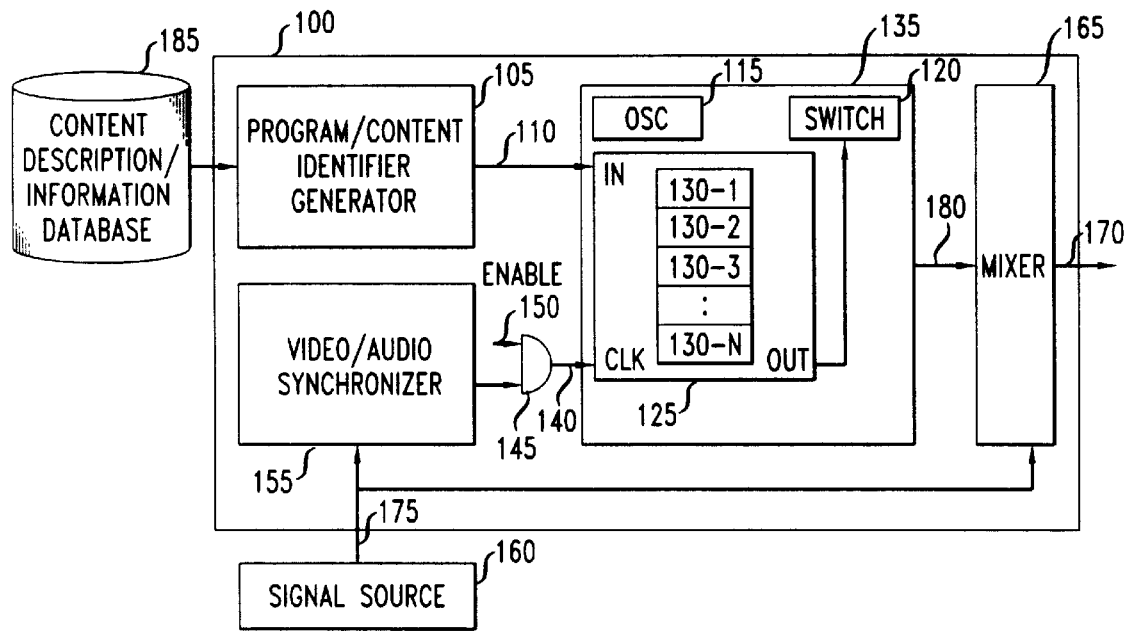
FIG. 1 is a block diagram of a mixed encoded signal generator arranged in accordance with the principles of the invention.

FIG. 1 is a block diagram of an illustrative mixed encoded signal generator 100 arranged in accordance with the principles of the invention. In accordance with this embodiment of the invention, ASK encoding is employed for modulating the source signal, e.g., carrier signal, for adding the transparent program identifier and/or transparent content identifier to the source signal so that the identifiers are not perceptible to a viewer of the program but have sufficient intensity for signal transmission and detection in accordance with the various aspects of the invention. It should be noted that for clarity of explanation, the illustrative embodiments described herein are presented as comprising individual functional blocks or combinations of functional blocks. The functions these blocks represent may be provided through the use of either shared or dedicated hardware, including, but not limited to, hardware capable of executing software. Illustrative embodiments may comprise digital signal processor ("DSP") hardware and/or software performing the operations discussed below. Further, in the claims hereof any element expressed as a means for performing a specified function is intended to encompass any way of performing that function, including, for example, a) a combination of circuit elements which performs that function; or b) software in any form (including, therefore, firmware, object code, microcode or the like) combined with appropriate circuitry for executing that software to perform the function. The invention defined by such claims resides in the fact that the functionalities provided by the various recited means are combined and brought together in the manner which the claims call for. Applicants thus regard any means which can provide those functionalities as equivalent as those shown herein.

In accordance with the embodiment of FIG. 1, the transparent identifiers are encoded data which are added to source signal 175 available from, e.g., signal source 160. The transparent identifiers are generated by program/content identifier generator 105 which can by a processor, computer or other device which encodes text, numerical information and the like, as a digital bit stream for recovery in a decoder configured for application with the digital bit stream. An illustrative decoder embodying the principles of the invention is discussed further below in conjunction with FIG. 3. In accordance with the invention, particular programs transmitted from signal source 160, e.g., a cable television company, are configured to carry a transparent program identifier and/or transparent program content identifier which will be used to provide the signal blocking aspects of the present invention as further discussed below.

More particularly, the transparent program identifier and/or transparent program content identifier are generated by program/content identifier generator 105 and applied to input 110 of, illustratively, a first-in, first-out ("FIFO") buffer 125 of encoder 135. Illustratively, the transparent program and/or content identifiers are generated as a function of information contained in content description/ information database 185. Database 185 contains information related to the individual programs supplied in the source signal (e.g., program content, program rating, subject matter, total viewing time) used by program/content identifier generator 105 in generating the requisite transparent identifiers, in accordance with the invention. The transparent program and/or content identifiers, e.g., 130-1 through 130-N, are stored in FIFO buffer 125 until a clock signal is applied to FIFO buffer 125, illustratively, across line 140. As will be understood, transparent identifiers 130-1 through 130-N can be any combination of transparent program identifiers and/or transparent content identifiers useful in the various signal blocking aspects of the invention. Illustratively, one bit of ASK encoded data is added to each successive frame of source signal 175 embodying the transparent program identifier associated with a particular program, or the transparent content identifier associated with a particular portion of a program. Of course, it will be readily understood, that a predetermined amount, e.g., "n" bits, of information can be added to each frame for carrying the transparent program and/or content identifier as further discussed below.

Illustratively, transparent identifier 130-1, e.g., a transparent program identifier, is superimposed with respect the content of a particular program transmitted within source signal 175 such that the effect of the added signal is not discernible by a viewer of the program but is discernible for providing the blocking of the signal in accordance with one aspect of the invention. Illustratively, transparent program identifier 130-1 is in digital form, i.e., a series of bits, uniquely identifying the particular program or portion of a program subject to blocking in accordance with the invention. In accordance with this embodiment of the invention, the transparent program identifier 130-1 is inserted into source signal 175 when the signal intensity of the particular program being transmitted is sufficient to carry the encoded ASK signal and when the signal does not contain any pattern that would generate a frequency component that is close to, and therefore interfere with, the frequency of the ASK signal to be added. Facilitating the insertion of the encoded ASK signal, i.e., transparent program identifier 130-1, is enable signal 150 which is applied to AND gate 145. Further, the second input of AND gate 145 is derived as a function of the output from video/audio synchronizer 155 which also receives source signal 175 as input.

Video/audio synchronizer 155 produces output pulses that are synchronized with each frame of source signal 175. Thus, so long as enable signal 150 is "high", the synchronization pulses (illustratively at 60 Hz) are transmitted through AND gate 145 and applied to clock input of FIFO buffer 125 across line 140. As a result, the information in FIFO buffer 125, e.g., transparent identifiers 130-1 through 130-N, are read out, one bit per frame and in synchronization with the frame, and thereafter applied to switch 120. Switch 120, illustratively, a flip-flop, is functionally closed when a "1" is applied as output from FIFO buffer 125, and functionally open when a "0" is output from FIFO buffer 125. Further, oscillator 115 generates a carrier signal (or tone) input to switch 120 at a predetermined frequency, e.g., 25 kHz, that is generally indiscernible when added to a viewed image. The output of switch 120 is controlled as a function of the carrier signal and the output from FIFO buffer 125 resulting in an ASK encoded signal 180 which represents the transparent program identifier and/or transparent content identifier as generated by program/content identifier generator 105. ASK encoded signal 180 is then combined, i.e., inserted, with source signal 175 by mixer 165 to produce mixed encoded signal 170. In accordance with the invention, mixed encoded signal 170 is monitored pursuant to the specifications of individual subscribers for facilitating the blocking of particular programs as discussed below. Further details regarding ASK encoding are described in U.S. Pat. No. 5,663,766, issued Sep. 2, 1997, to T. Sizer (a co-applicant in the present application) and assigned to the same assignee as the present application. The foregoing embodiment of the invention using ASK encoding is illustrative in nature and, as will be appreciated by those skilled in the art, there exist other encoding alternatives which can be used in the context of the principles of the invention.

Figure 2:
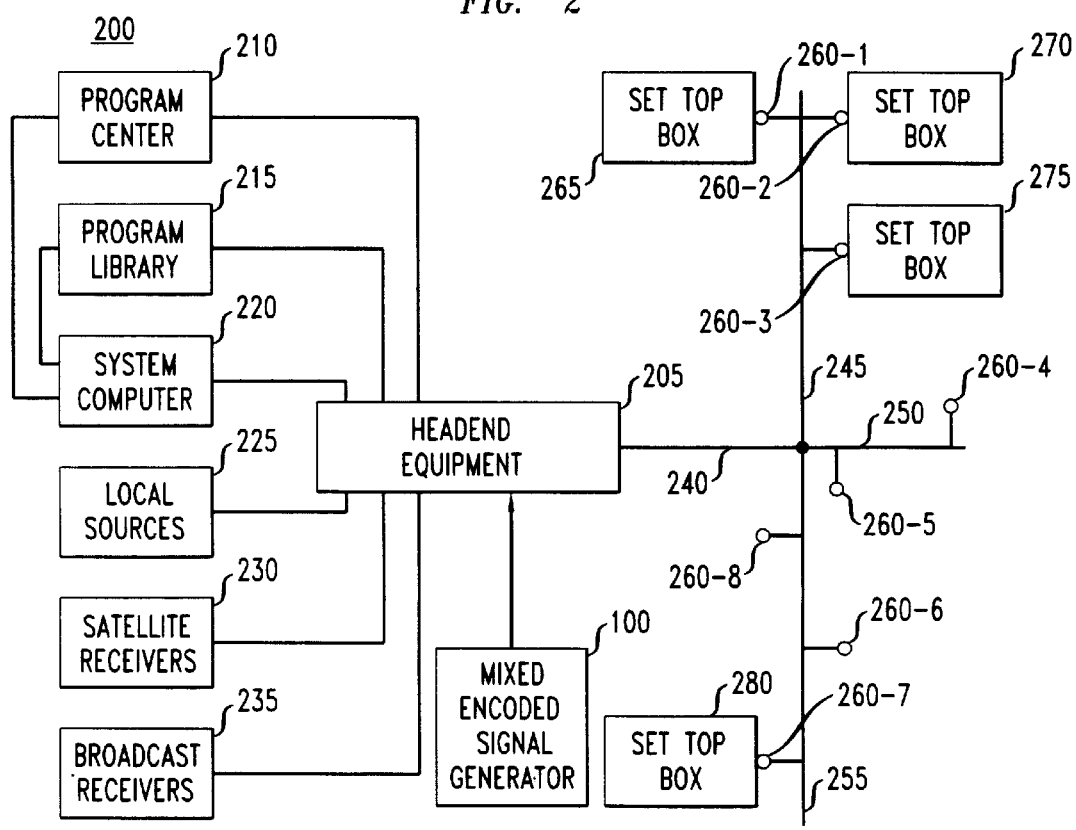
FIG. 2 is an illustrative cable television system configured in accordance with the principles of the invention.

Turning our attention to FIG. 2, an illustrative cable television system 200 is shown configured in accordance with the principles of the invention. A typical cable television system under the control of system computer 220 comprises headend equipment 205 at a central location, a distribution network consisting of various feeders 240, branches 245 through 255, and connections to subscribers locations 260-1 through 260-8, where set top boxes, converters and television receivers (or cable-ready television receivers alone) receive signals from the distribution network. Feeders 240 and branches 245 through 255 can be coaxial cable, optical fiber cable, combinations of the two, or other transport equipment. Various television programs are fed into different channels of cable television system 200 by headend equipment 205. Such programs may be received, illustratively, from local broadcasts by broadcast receivers 235, from communications satellites by satellites receivers 230, or directly from local sources 225. Additionally, system computer 220 can receive programming from such sources as program center 210 or program library 215. As discussed previously, the myriad of programs, and their disparate content levels, available in cable television system 200 present subscribers with difficult viewing (both personal and family) decisions of these programs which contain varying amounts of violence, sexual content, and coarse language. As will be appreciated, cable television system 200 is illustrative in nature and the principles of the invention herein apply to other types of signal broadcasting systems, e.g., over-the-air television broadcast systems and satellite broadcast systems, to name just a few.

In accordance with the present embodiment of the invention, cable television system 200 includes mixed encoded signal generator 100 for enhancing the signal transmitted, e.g., by headend equipment 205, with a transparent program identifier associated with each program for enabling the blocking of individual programs, or a transparent content identifier for blocking portions of a program, in accordance with the invention. While the present embodiment of the invention combines mixed encoded signal generator 100 with head equipment 205, it will be appreciated that the insertion of the transparent program and/or content identifiers, in accordance with the invention, can occur anywhere in the transmission of the source signal and just prior to actual viewing by the subscriber. In accordance with this embodiment of the invention, each of the programs included in the transmitted signal supplied by headend equipment 205 via feeders 240 will have a transparent program and/or content identifier generated as discussed above. Thereafter, as the transmitted signal is received at its final destination, illustratively, subscriber locations 260-1 through 260-8, particular ones of the transmitted programs are blocked at specific subscriber locations as a function of that subscriber's desired viewing preferences. Advantageously, the subscriber is given complete control and selectivity over which individual programs are viewed, e.g., by children of the subscriber.

Figure 3:
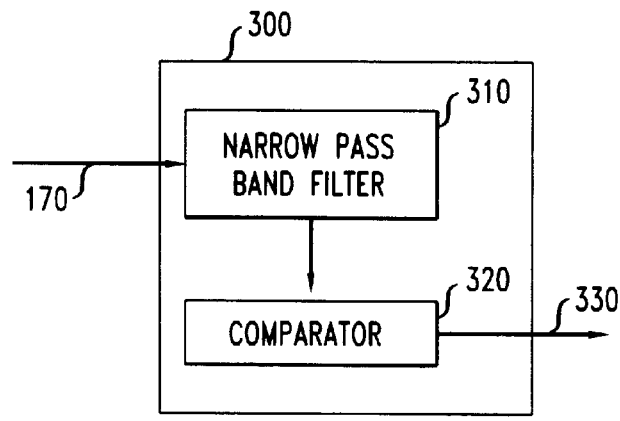
FIG. 3 is an illustrative decoder for decoding the signal generated by the mixed encoded signal generator of FIG. 1.

More particularly, in accordance with the embodiment of the invention, subscriber locations 260-1 through 260-8 are configured with receiver/decoder 300 shown in FIG. 3. Turning our attention to FIG. 3, receiver/decoder 300 is shown configured, in accordance with invention, for detecting the individual transparent program identifiers and/or program content identifiers associated with the individual programs which are embedded within the received source signal from, e.g., headend equipment 205. More particularly, in accordance with an embodiment of the invention, mixed encoded signal 170 is received as input by receiver/decoder 300 in narrow pass band filter 310 which is tuned to the frequency of oscillator 115 (see, FIG. 1) of encoder 135. In this way, the output of narrow pass band filter 310 is applied to comparator 320 which compares and detects the difference in signal strength between individual frames of mixed encoded signal 170 containing energy at the frequency of oscillator 115 and frames which do not contain such energy levels. For example, narrow pass band filter 310 may have a pass band of 1 kHz to match the frequency of oscillator 115. At such a frequency, comparator 320 can be implemented as a diode detector for facilitating the signal strength comparison as described above. As such, the individual transparent program identifiers and/or program content identifiers, associated with the individual programs which are embedded within the received source signal are decoded and transmitted as output 330 from receiver/decoder 300 and used to block the source signal as further described below. Further, in accordance with alternative embodiments of the invention, comparator 320 compares and detects differences in signal strength by comparing amplitude differences and/or phase differences in the frames of mixed encoded signal 170.

Advantageously, the transparent program identifiers and/ or transparent content identifiers are transmitted via the video and/or audio component of the source signal. As will be appreciated, receiver/decoder 300 can be used for decoding the encoded transparent identifiers whether embedded in the video or audio component of the source signal. Thus, a built-in redundancy is facilitated in the event that one of the signal components experiences a transmission failure or degradation. For example, if the audio component carrying the transparent identifiers experiences a transmission failure, the redundant set of transparent identifiers carried by the video component of the source signal are used to provide the signal blocking in accordance with the invention.

Figure 4:
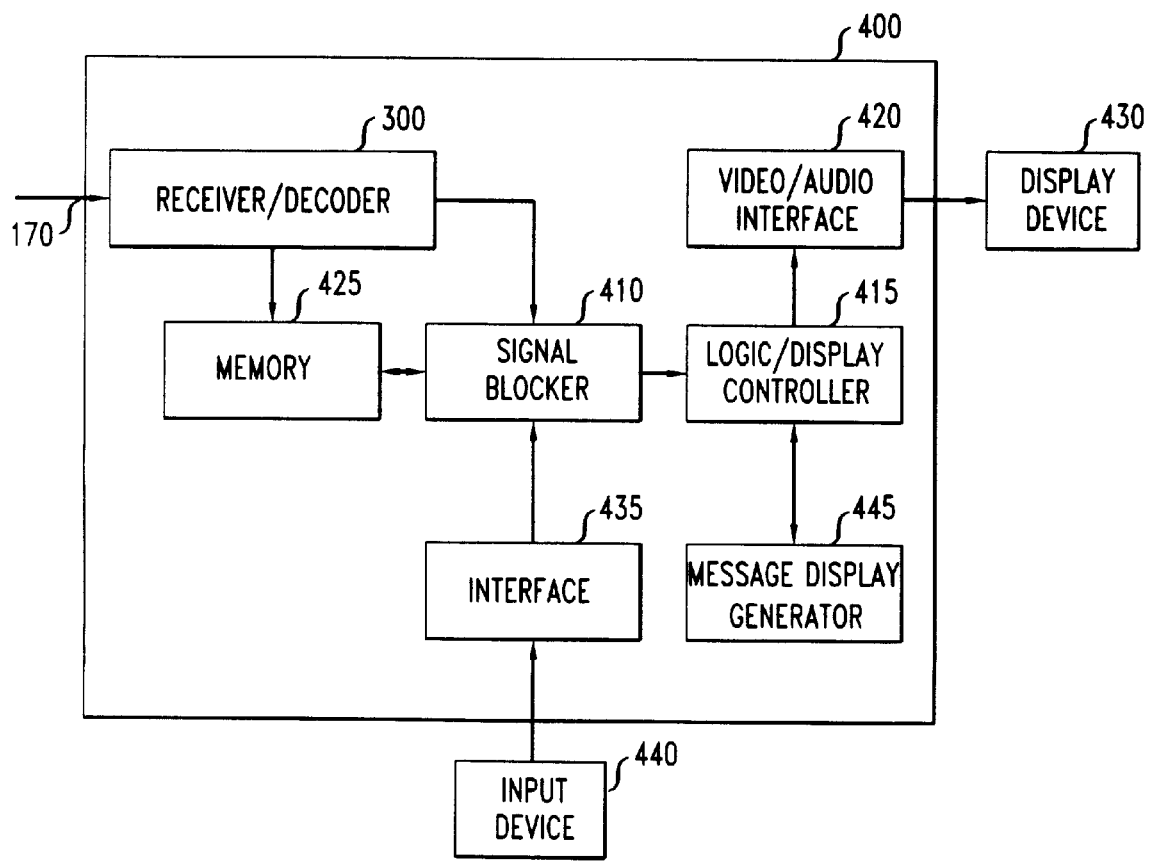
FIG. 4 is an illustrative configuration for the set top box shown in the cable television system of FIG. 2.

In accordance with an embodiment of the invention, receiver/decoder 300 is located at a central location within subscriber locations, e.g., subscriber location 260-4, for blocking individual programs and/or portions thereof in accordance with the subscriber's predefined viewing preferences. Illustratively, receiver/decoder 300 could be placed at the incoming feed from branch 250 to subscriber location 260-4, e.g., the cable television utility box of a private residence. Alternatively, in accordance with further embodiments of the invention, receiver/decoder 300 is, illustratively, part of a set top box, e.g., set top boxes 265 through 280, which are connected within a particular subscriber location. An illustrative set top box configuration is shown in FIG. 4 and discussed further below. As will be appreciated, the illustrative set top box configuration herein is one of many hardware arrangements in which the principles of the invention are realized.

Advantageously, one aspect of the invention provides for the blocking of individual programs as a function of viewer, i.e., subscriber, choice rather than the wholesale blocking of entire classes of programs as in previous techniques. In addition, in accordance with a aspect of the invention, the blocking of particular portions of programs as a function of viewer preferences is facilitated. As will be appreciated, the signal blocking of individual programs and/or portions thereof in accordance with the invention, can be in a variety of devices, e.g., televisions, VCR's, monitors, etc., which serve as the vehicle through which the programs are delivered to subscribers. Thus, while the discussion herein centers on television program viewing embodiments, the invention is useful in other program viewing arrangements that will be readily apparent to those skilled in the art.

Figure 6:
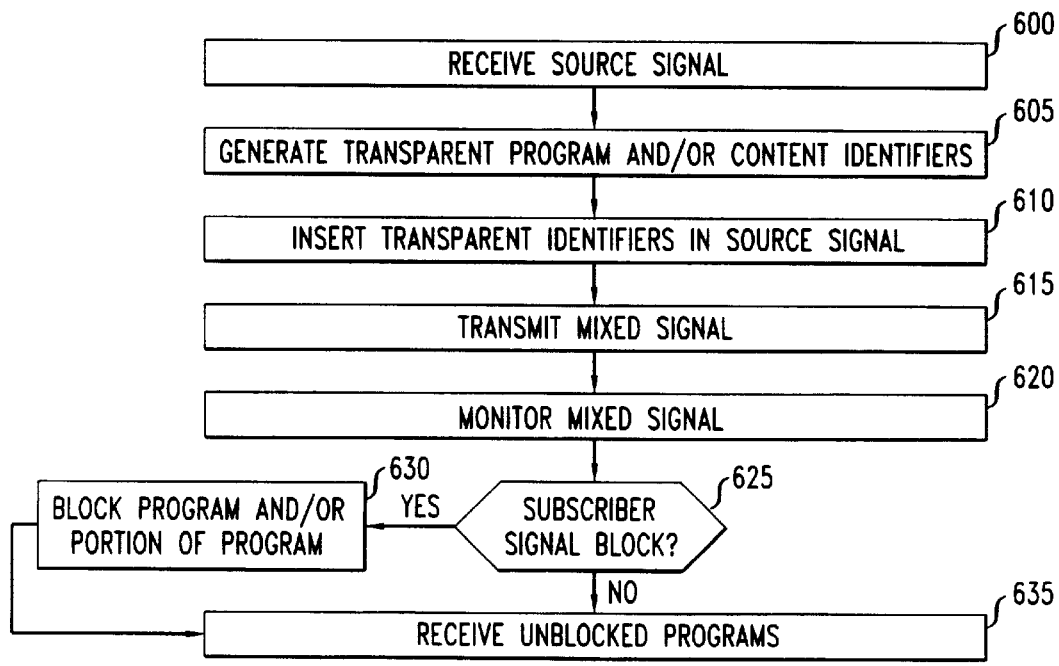
FIG. 6 is a flow chart depicting the steps for video blocking individual programs in accordance with the invention.

Further to the discussion of the invention provided above, FIG. 6 shows a flow chart depicting the steps for signal blocking in accordance with the principles of the invention. More particularly, the source signal containing a plurality of individual programs is received (block 600.) The transparent program identifiers and/or transparent content identifiers, as described above, are generated (block 605.) The transparent identifiers are inserted (block 610) into the source signal thereby forming a mixed signal carrying the individual programs. This mixed signal is transmitted (block 615) to a subscriber location, e.g., in cable television system 200 shown in FIG. 2. The mixed signal is monitored (block 620) in accordance with a set of predefined viewing preferences specified by the particular subscriber. With regard to the incoming mixed signal to the subscriber, a determination is made as to whether particular programs and/or portions of programs are to be blocked from viewing (block 625) in accordance with the subscriber's viewing preferences. If so, the particular program and/or program portion is blocked (block 630) and the unblocked programs are received (block 635) by the subscriber for viewing.

Turning our attention to FIG. 4, an illustrative set top box 400, e.g., set top box 265 shown in FIG. 2, is shown configured in accordance with the principles of the invention. The incoming signal to set top box 400 is, illustratively, mixed encoded signal 170 as transmitted from headend equipment 205 and received by receiver/decoder 300 (see, FIG. 3.) As described previously, the signal is mixed, that is, particular programs transmitted by mixed encoded signal 170 contain the encoded transparent program identifier and/or transparent content identifier as describe above. In accordance with an illustrative embodiment of the invention, receiver/decoder 300 (see, FIG. 3) decodes mixed encoded signal 170 as described previously and the decoded transparent identifiers are stored in memory 425. Further, signal blocker 410 contains the particular viewing preferences of the subscriber using set top box 400 which are received, illustratively, through interface 435 from the subscriber using input device 440. In this way, the subscriber designates their signal blocking preferences which are used by signal blocker 410 to block particular programs and/or portions of programs transmitted via the incoming signal.

More particularly, in accordance with the invention, signal blocker 410 compares the subscriber signal blocking preferences with the decoded transparent identifiers stored, illustratively, in memory 425, and blocks those programs and/or portions thereof specified by the subscriber which are presently being received in the incoming signal. In accordance with an embodiment of the invention, message display generator 445 provides particular messages for display on display device 430, e.g., a television, to the subscriber when signal blocking occurs in accordance with the invention. For example, signal blocker 410 may determine, as a function of a decoded transparent identifier, that a particular program, e.g., a broadcast television police drama, is to be blocked in accordance with the subscriber's preferences. In such an instance, logic/display controller 415 acting on a blocking signal from signal blocker 410 will access and receive from message display generator 445 a predetermined message for display to the subscriber. An illustrative example of such a message is:

"The police drama presently being shown on this program channel has been blocked from viewing in accordance with your viewing preferences. If you wish to view another program, please select the channel now."

Thus, the subscriber will be informed directly on display device 430 that a particular program is being blocked.

Thereafter, the unblocked programs contained in the incoming signal are passed, in a conventional manner, through logic/display controller 415 and video/audio interface 420 for viewing by the subscriber on display device 430. Advantageously, in accordance with the subscriber's particular preference, particular programs and/or portions thereof are blocked from viewing by, e.g., the subscriber's children, which contain content deemed inappropriate by that subscriber.

In accordance with further embodiments of the invention, frequency shift keying ("FSK") is used, e.g., by mixed encoded signal generator 100, for encoding the transparent program and/or content identifiers. In accordance with this FSK encoding embodiment of the invention, "n" bits of data, i.e., the transparent identifier associated with a particular program, are encoded in each frame interval which generate a first or second different frequency. As before, at a predefined interval, the FSK encoded signal is added to the incoming source signal such that the transparent program and/or content identifiers are imperceptible to the viewer. In accordance with the invention, an FM detector is used to recover the FSK encoded signal and a signal blocking determination is made in accordance with the subscriber's designated viewing preferences.

Figure 5:
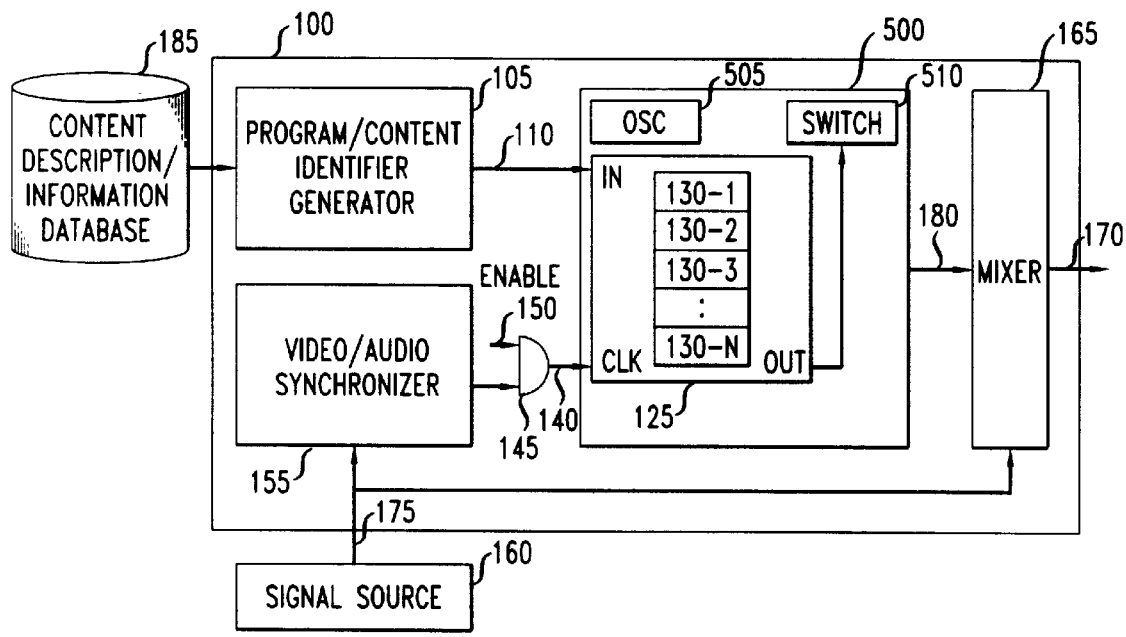
FIG. 5 is a block diagram of a further configuration of the mixed encoded signal generator of FIG. 1 in accordance with the principles of the invention.

More particularly, FIG. 5 shows mixed encoder signal generator 100 configured in accordance with such the FSK embodiment of the invention. In particular, oscillator 505 in encoder 500 is configured to output first or second different output frequencies, $f_1$ and $f_2$ respectively. These output frequencies are derived as a function of the value of the digital data output from FIFO buffer 125, e.g., the value "1" or "0". As described previously, synchronization is obtained using video/audio synchronizer 155, and this synchronization is used to clock data from FIFO buffer 125 thereby controlling the output of oscillator 505. Switch 510 receives a control input from AND gate 140 which allows the output of oscillator 505 to pass to mixer 165 for combination with source signal 175 only when the output from AND gate 140 is high. In this way, the FSK encoded signal 180 from switch 510 is combined with source signal 175 such that during at least a portion of each frame, a component at frequency $f_1$ or a component of frequency $f_2$ is added to source signal 175 thereby encoding the transparent program and/or content identifier into mixed encoded signal 170 in accordance with the invention.

The foregoing merely illustrates the principles of the present invention. Therefore, the invention in its broader aspects is not limited to the specific details shown and described herein. Those skilled in the art will be able to devise numerous arrangements which, although not explicitly shown or described herein, embody those principles and are within their spirit and scope.

We claim:

1. A method for blocking a signal, the method comprising the steps of:

generating a plurality of program identifiers, the plurality of program identifiers being visually imperceptible and generated using amplitude shift keying encoding, each program identifier being associated with a particular one program of a plurality of programs transmitted in the signal;

inserting at least one program identifier of the plurality of program identifiers into the signal;

generating at least one content identifier, the content identifier identifying a particular portion of a second program of the plurality of programs, the content identifier being visually imperceptible and generated using amplitude shift keying encoding;

inserting the at least one content identifier into the signal;

blocking a viewing of a first program of the plurality of programs as a function of the program identifier associated therewith, the program identifier being recovered from the signal as function of a signal strength of the signal, the signal comprising a plurality of frames and the signal strength being a measure of a amplitude difference in successive frames of the signal; and blocking a viewing of the particular portion of the second program as a function of the content identifier, the content identifier being recovered from the signal as function of the signal strength of the signal.

2. The method of claim 1 wherein the signal has a video component and a audio component such that the at least one program identifier and the at least content identifier are each inserted in the video component and the audio component of the signal.

3. The method of claim 1 wherein the generating the at least one content identifier is performed as a function of a set of viewing preferences defined by a subscriber.

4. A signal blocking method comprising the steps of:

receiving a signal containing a plurality of programs;

identifying at least one program identifier encoded within the signal, the at least one program identifier encoded using amplitude shift keying, the at least one program identifier identifying a particular program of the plurality of programs destined for a subscriber location, the program identifier being perceptually invisible;

identifying at least one content identifier encoded within the signal, the at least one content identifier being associated with a particular portion of at least one program of the plurality of programs, the content identifier being perceptually invisible and encoded using amplitude shift keying;

blocking a viewing of the particular program at the subscriber location as a function of the program identifier, the program identifier being recovered from the signal as function of a signal strength difference of the signal, the signal strength determined as a function of a signal amplitude difference between a first frame and a second frame of the signal; and blocking a viewing of the particular portion of the at least one program as a function of the content identifier, the content identifier being recovered from the signal as function of the signal strength difference of the signal.

5. The method of claim 4 including the further steps of:

viewing, at the subscriber location, particular ones of the plurality of program which remain unblocked.

6. The method of claim 4 wherein the signal is received from a cable television provider.

7. The method of claim 6 wherein the particular portion of the at least one program is identified as a function of a set of predefined viewer preferences.

8. A method for blocking a television signal, the method comprising the steps of:

receiving a television signal, the television signal including a plurality of programs;

identifying a plurality of program identifiers encoded within the television signal, the plurality of program identifiers encoded using amplitude shift keying, each one of the encoded program identifiers corresponding to a different program of the plurality programs;

identifying a plurality of content identifiers encoded within the television signal, the plurality of content identifiers encoded using amplitude shift keying, each one of the encoded content identifiers corresponding to a particular portion of a different program of the plurality of programs;

selectively blocking a viewing of particular ones of the plurality of programs as a function of their corresponding program identifier, the program identifier being recovered from the encoded television signal as function of a signal strength of the television signal, the signal strength determined as a function of a signal amplitude difference between a first frame and a second frame of the television signal; and selectively blocking the viewing of at least one of the particular portions of the different programs as function of the corresponding content identifier, the content identifier being recovered from the television signal as function of the signal strength of the television signal.

9. The method of claim 8 wherein the plurality of program identifiers and the plurality of content identifiers are encoded as a function of a set of viewer preferences.

10. A television signal receiving apparatus comprising:
a receiver for receiving a television signal having a plurality of frames, the television signal containing a plurality of programs, a plurality of encoded program identifiers and a plurality of encoded content identifiers, the plurality of encoded program identifiers and the plurality of encoded content identifiers encoded using amplitude shift keying, each program identifier identifying a particular one program of the plurality of programs, and each content identifier being associated with a particular portion of a different program of the plurality of programs;
a decoder for decoding the plurality of program identifiers and the plurality of content identifiers encoded within the television signal, the decoding of the program identifiers and the content identifiers being performed as a function of a signal difference between successive frames of the television signal, the signal difference determined as a function of a signal amplitude difference between the successive frames of the television signal; and
a signal blocker for selectively blocking a viewing of particular ones of the plurality of programs by a subscriber as a function of comparing the decoded plurality of program identifiers and the decoded plurality of content identifiers to a set of viewing preferences defined by the subscriber.

11. The television signal receiving apparatus of claim 10 wherein the apparatus is a cable television set top device.

12. An apparatus for processing a encoded television signal, the encoded television signal being produced by encoding, using amplitude shift keying, a plurality of program identifiers and a plurality of content identifiers, each program identifier being associated with a particular one program of a plurality of programs transmitted in a source signal, each content identifier being associated with a particular portion of a program of the plurality of programs, and inserting at least one program identifier and at least one content identifier into the source signal to produce the encoded television signal, and transmitting the encoded television signal to a communications channel, the apparatus comprising:
a receiver for receiving the encoded television signal from the communications channel;
a decoder for decoding the encoded television signal and recovering the source signal; and
a signal blocker for selectively blocking a viewing of particular ones of the programs of the source signal as a function of the at least one program identifier and the at least one content identifier, the at least one program identifier and the at least one content identifier being recovered from the encoded television signal as a function of a signal difference between a first frame and a second frame in the television signal, the signal difference determined as a function of a signal amplitude difference between the first frame and the second frame.

13. The apparatus of claim 12 wherein the selectively blocking the viewing of the particular ones of the programs is determined as function of comparing the at least one program identifier or the at least one content identifier with a plurality of viewing preferences defined by a viewer.

14. The apparatus of claim 13 further comprising
a memory for storing the plurality of viewing preference defined by the viewer.

15. The apparatus of claim 13 wherein the source signal is supplied by a cable television provider.

16. The apparatus of claim 12 wherein the apparatus is connected to a display device.

17. A signal blocking apparatus comprising:
means for receiving a signal containing a plurality of programs, the signal having a plurality of frames;
means for identifying at least one program identifier encoded within the signal, the at lease one program identifier encoded using amplitude shift keying, the at least one program identifier identifying a particular program of the plurality of programs destened for a subscriber location, the program identifier being perceptually invisible and identified by detecting a signal strength difference between successive frames of the signal, the signal strength difference determined as a function of a signal amplitude difference between the successive frames of the signal;
means for identifying at least one content identifier encoded within the signal, the at least one content identifier encoded using amplitude shift keying, the at least one content identifier being associated with a particular portion of at least one program of the plurality of programs destined for a subscriber location, the content identifier being perceptually invisible and identified as a function of the signal strength difference; and
means for selectively blocking a viewing of the particular program at the subscriber location as a function of the program identifier and the content identifier.

18. The signal blocking apparatus of claim 17 wherein the means for selectively blocking the viewing of the particular program compares the at least one program identifier with a plurality of viewing preferences defined by a viewer.

* * * * *